No. 761,184. PATENTED MAY 31, 1904.
W. SCHWARTZ.
HORSE DETACHER.
APPLICATION FILED JAN. 11, 1904.
NO MODEL.
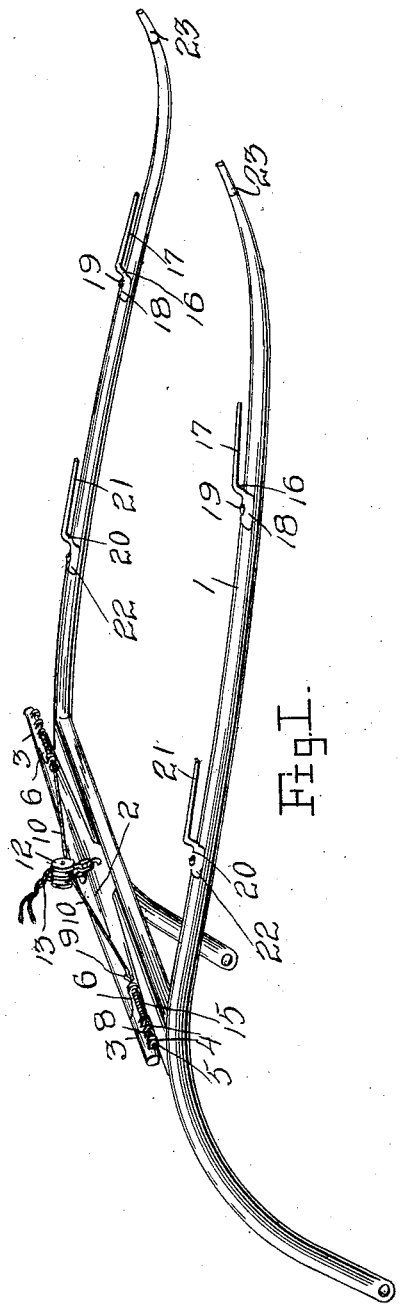
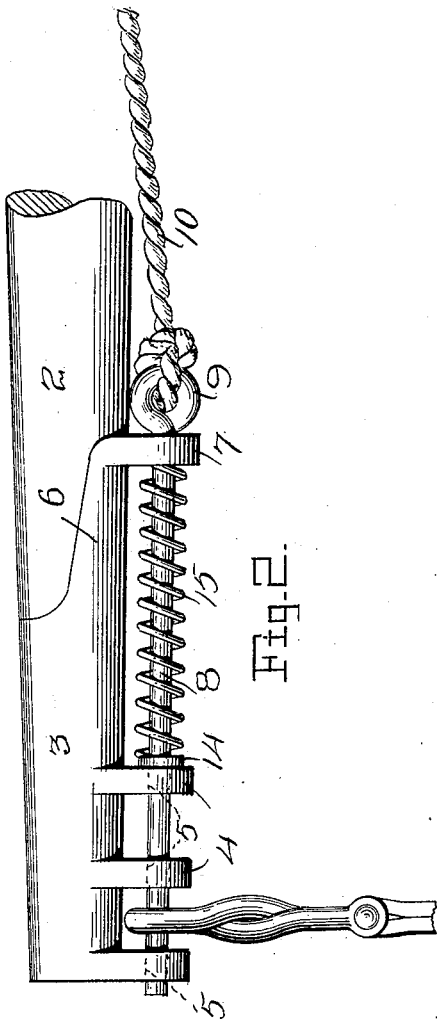
Witnesses
E. K. Reichenbach.
J. Willson
Inventor
Wm. Schwartz.
By H. B. Willson.
Attorney No. 761,184.

Patented May 31, 1904.

UNITED STATES PATENT OFFICE.

WILLIAM SCHWARTZ, OF ROSCOE, PENNSYLVANIA.

HORSE-DETACHER.

SPECIFICATION forming part of Letters Patent No. 761,184, dated May 31, 1904.

Application filed January 11, 1904. Serial No. 188,642. (No model.)

*To all whom it may concern:*

Be it known that I, WILLIAM SCHWARTZ, a citizen of the United States, residing at Roscoe, in the county of Washington and State of Pennsylvania, have invented certain new and useful Improvements in Horse-Detachers; and I do declare the following to be a full, clear, and exact description of the invention, such as will enable others skilled in the art to which it appertains to make and use the same.

This invention relates to improvements in horse-detaching devices.

The object of the invention is to provide a device whereby a horse may be quickly detached from a vehicle in case of an accident or runaway, so that the occupant of the vehicle will not be in danger of injury.

A further object is to provide a device of this character which may be quickly applied to the shafts of a vehicle and which will be simple in construction, strong, durable, reliable, inexpensive, and well adapted to the purpose for which it is designed.

With these and other objects in view the invention consists of certain novel features of construction, combination, and arrangement of parts, as will be more fully described, and particularly pointed out in the appended claim.

In the accompanying drawings, Figure 1 is a perspective view of a pair of shafts, showing the application of the device. Fig. 2 is an enlarged detail plan view of one end of the swingletree, showing one of the trace connections applied thereto.

Referring more particularly to the drawings, 1 denotes the shafts of a vehicle.

2 denotes the swingletree, which is pivotally connected to the cross-bar of the shafts in the usual manner. On the outer ends of the swingletree are secured ferrules 3, on the forward side and near the outer ends of which are formed a series of lugs or ears 4, which are spaced apart, as shown, and in said ears or lugs are formed alined apertures 5. On the inner end of each ferrule is formed an extension 6, on which is formed an apertured lug or ear 7, which corresponds and is in line with the lugs 4 on the outer ends of the ferrules. A pin or bolt 8 is slidably engaged with the apertures in the lugs 4 and 7 of each of the ferrules, and on the inner ends of the pins or bolts 8 are formed eyes 9, to which are connected the ends of two cords or ropes 10, which extend inwardly and are passed through a double pulley 12, which is loosely connected to an eye in the forward side of the swingletree. The cords or ropes 10 after passing through the pulley 12 are brought together and securely bound or tied, as at 13, and then are passed upwardly and rearwardly into the vehicle within convenient reach of the driver or occupant of the same.

On each of the pins or bolts 8 adjacent to the inner one of the lugs 4 is secured a collar 14, and between said collar and the lug 7 is arranged a coiled spring 15, the tension of which is normally exerted to force the pin 8 outwardly through the apertures in the lugs 4.

On the upper sides of the shafts, near their forward ends, are secured a pair of shaft-supporting devices 16, which consists of rods 17, having downwardly bent inner ends which are flattened and bent, as at 18, to conform to the shape of the shafts. A bolt 19 is passed through said flat bent portion and through the shafts, whereby the rods 17 are secured to the shafts, as shown. The shaft-supporting devices 16 are adapted to engage the lower ends of the shaft-supporting straps from the saddle. (Not shown.)

On the shafts in rear of the supporting devices are secured holdback devices 20, which are similar in construction to the supporting devices 16 and consist of rods 21, having downwardly-bent flattened inner ends 22, by which they are secured to the shafts. The rods 21 are adapted to engage the backing or breeching strap, (not shown,) whereby the vehicle may be backed when desired. The rods 17 and 21 are of sufficient length to prevent the disengagement of the supporting or breeching straps when the traces are connected to the swingletree, but which will permit said straps to be readily slipped therefrom when the traces are disengaged and the horse leaves the shafts.

The outer ends of the shafts are curved upwardly, as shown at 23, so that should the horse be released when going at a considerable speed and the shafts dropped the ends of the same would not be driven into the ground by the momentum of the vehicle or strike obstructions and suddenly stop the vehicle, and thereby throw the occupants of the same out. By curving the outer ends of the shafts upwardly they will be caused to slide over the small obstructions which might be in their path and will also be prevented from digging into the ground and perhaps broken.

In hitching up the horse to the vehicle the supporting and breeching straps are slipped over the ends of the rods 17 and 21 and to cockeye on the ends of the traces engaged with the pins or bolts 8 between two of the lugs 4. When in case of accident or from any other cause it is desired to quickly detach the horse from the vehicle, all that is necessary is to give the cords 10 a slight pull, which will simultaneously withdraw the pins or bolts 8 from engagement with the cockeyes on the traces and causing the same to drop, thus permitting the horse to leave the shafts.

While the invention has been shown and described in connection with a single team, it will be obvious that the same may be applied with equal advantage to double teams for releasing both horses.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a horse releasing attachment for vehicles, a swingletree 2 provided upon each end with a ferrule 3, each ferrule having a series of integral lugs or ears 4 at its outer end, said lugs or ears being formed with alined apertures 5, and provided at its inner end at its forked side with an extension 6 formed with an apertured ear 7 disposed in the plane of the ears 4, a bolt 8 slidable longitudinally in said ears 4 and 7 and provided with the eye 9 and collar 14, the latter adapted to engage the inner ear 4 to limit the outward movement of said bolt, a coiled spring 15 surrounding the bolt between the ear 7 and collar 14, a double direction-sheave 12 disposed at the center of the swingletree, and flexible connections 10 attached at their outer ends to the eyes 9 of the bolts, extending inwardly therefrom to the center of the swingletree, passed around the double sheave, and connected at their inner ends for simultaneous operation, substantially as described.

In testimony whereof I have hereunto set my hand in presence of two subscribing witnesses.

WILLIAM SCHWARTZ.

Witnesses:
J. H. HILEMAN,
FRANK MELLENKAMP.